US012379692B2

(12) United States Patent
Fuji et al.

(10) Patent No.: US 12,379,692 B2
(45) Date of Patent: Aug. 5, 2025

(54) TIMEPIECE PARTS AND TIMEPIECE

(71) Applicant: SEIKO EPSON CORPORATION, Tokyo (JP)

(72) Inventors: Tsubasa Fuji, Shiojiri (JP); Daiki Furusato, Ina (JP)

(73) Assignee: SEIKO EPSON CORPORATION (JP)

( * ) Notice: Subject to any disclaimer, the term of this patent is extended or adjusted under 35 U.S.C. 154(b) by 418 days.

(21) Appl. No.: 17/850,021

(22) Filed: Jun. 27, 2022

(65) Prior Publication Data

US 2022/0413439 A1 Dec. 29, 2022

(30) Foreign Application Priority Data

Jun. 28, 2021 (JP) ................................ 2021-106447

(51) Int. Cl.
*B32B 15/04* (2006.01)
*B32B 17/06* (2006.01)
*G04B 19/12* (2006.01)

(52) U.S. Cl.
CPC .................................... *G04B 19/12* (2013.01)

(58) Field of Classification Search
CPC ............................ C23C 14/0015; C23C 14/08
USPC ................................ 428/432, 434, 632, 428
See application file for complete search history.

(56) References Cited

U.S. PATENT DOCUMENTS

| | | | | |
|---|---|---|---|---|
| 2018/0217558 A1* | 8/2018 | Furusato | ................ | G04B 37/22 |
| 2018/0217559 A1* | 8/2018 | Furusato | ................ | G04B 39/00 |
| 2018/0217560 A1* | 8/2018 | Furusato | .............. | G04B 39/002 |
| 2021/0063968 A1* | 3/2021 | Furusato | ................ | G04B 19/12 |
| 2024/0111251 A1* | 4/2024 | Fuji | ...................... | G04D 3/0074 |
| 2024/0142914 A1* | 5/2024 | Fuji | .................... | G04B 45/0076 |
| 2024/0241479 A1* | 7/2024 | Fuji | .................... | G04B 45/0084 |
| 2024/0427292 A1* | 12/2024 | Fuji | ........................ | G04B 19/12 |

FOREIGN PATENT DOCUMENTS

| | | |
|---|---|---|
| JP | 2018-124267 A | 8/2018 |
| JP | 2018-124268 A | 8/2018 |
| JP | 2018-124269 A | 8/2018 |
| JP | 2020-034478 A | 3/2020 |

* cited by examiner

*Primary Examiner* — Lauren R Colgan

(74) *Attorney, Agent, or Firm* — Harness, Dickey & Pierce, P.L.C.

(57) ABSTRACT

A timepiece part includes a base and a color toning layer provided on the base. The color toning layer includes a first oxide film, a first metal film, a protective film, and a second oxide film. The first oxide film is provided between the base and the second oxide film. Between the first oxide film and the second oxide film, the first metal film and the protective film are provided in the presented order from the side facing the first oxide film.

9 Claims, 5 Drawing Sheets

TIMEPIECE PARTS AND TIMEPIECE

The present application is based on, and claims priority from JP Application Serial Number 2021-106447, filed Jun. 28, 2021, the disclosure of which is hereby incorporated by reference herein in its entirety.

BACKGROUND

1. Technical Field

The present disclosure relates to timepiece parts and a timepiece including the timepiece parts.

2. Related Art

Timepieces are required to have excellent aesthetics as an ornament in addition to functionality as a useful article. To enhance a feel and quality of the appearance of the timepiece, it is known that precious metal materials are used to form a dial, a case, and other timepiece parts. However, precious metal materials are generally expensive, and excessive use of precious metal materials is required to be controlled due, for example, to the amount of reserves.

In view of the points described above, the present applicant has proposed, for example, the technologies described in JP-A-2018-124267, JP-A-2018-124268, and JP-A-2018-124269. In JP-A-2018-124267, timepiece parts having a feel and quality of the appearance comparable to those of timepiece parts made of precious metal materials are achieved by layering a color toning layer formed of a plurality of oxide films on a base having a metallic luster. Such timepiece parts are achieved by layering a plurality of oxide films to adjust the optical reflectance and a tint so that a color tone having intended brightness, saturation, and hue while making use of the metallic luster of the base. A color tone having intended brightness, saturation, and hue is also referred to as an intended color tone. Similarly, the technologies described in JP-A-2018-124268 and JP-A-2018-124269 have the following point in common with JP-A-2018-124267: a color toning layer formed of a plurality of oxide films is layered on a base.

The technologies described in JP-A-2018-124267, JP-A-2018-124268, and JP-A-2018-124269, however, have room for improvement. In detail, to obtain an intended color tone, at least 10 oxide films need to be layered in some cases. In such cases, the color toning layer has a complicated configuration, resulting in a problem of low productivity and film reliability. That is, there is a need for timepiece parts each having a simple configuration but exhibiting an intended color tone.

SUMMARY

A timepiece part according to an aspect of the present application includes a base and a color toning layer provided on the base. The color toning layer includes a first oxide film, a first metal film, a protective film, and a second oxide film. Between the first oxide film and the second oxide film, the first metal film and the protective film are provided in a presented order from a side facing the first oxide film.

A timepiece according to another aspect of the present application includes the timepiece part described above.

DESCRIPTION OF EXEMPLARY EMBODIMENTS

First Embodiment

Overview of Timepiece

Figure 1:
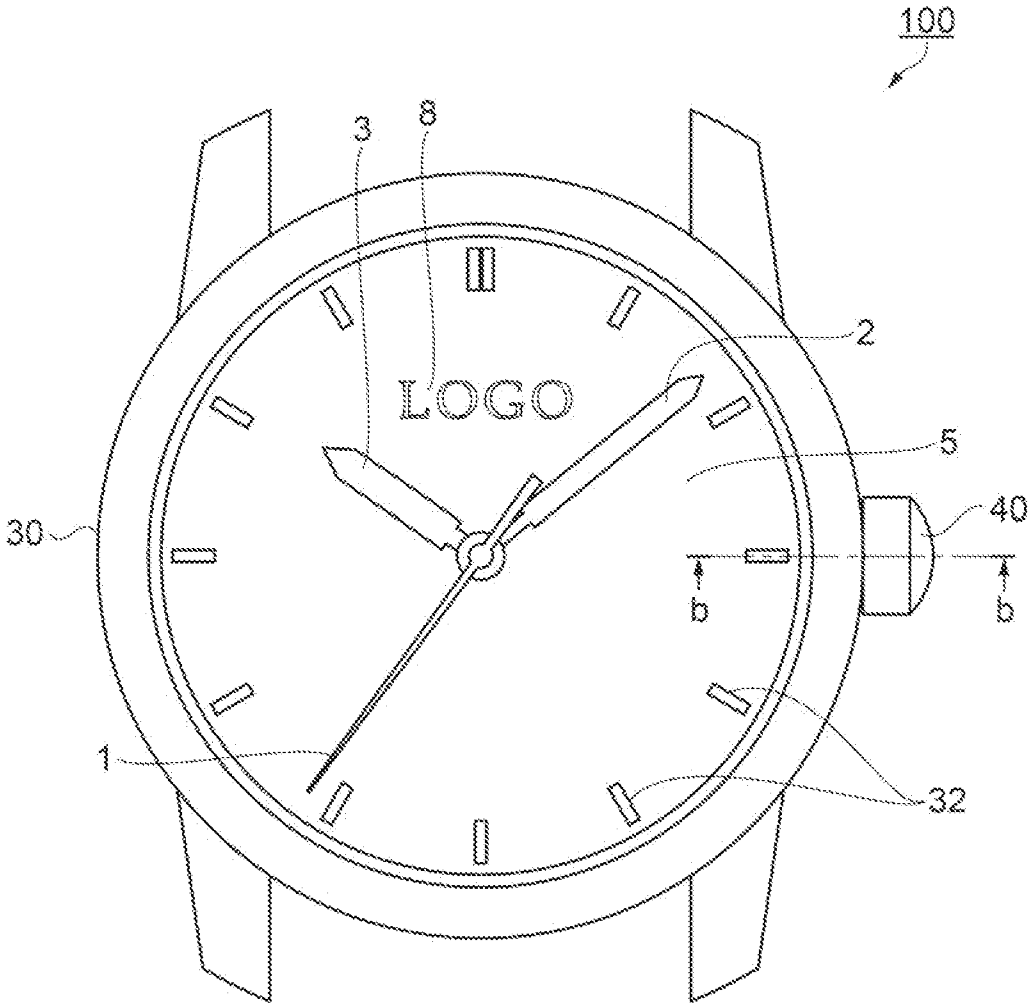
FIG. 1 is a plan view of a timepiece according to a first embodiment.

FIG. 1 is a plan view of a timepiece according to the present embodiment.

A timepiece 100 according to the present embodiment is a three-hand analog wristwatch.

The timepiece 100 is formed of a case band 30, a dial 5, a second hand 1, a minute hand 2, an hour hand 3, a crown 40, and other components. The dial 5 corresponds to a timepiece part.

The case band 30 is a case and is made of hard metal, such as stainless steel or titanium. A movement 35 (FIG. 8) that drives the indicating hands is accommodated behind the dial 5 in the case band 30.

The dial 5 has a logo 8 and a scale 32 provided thereon. An insertion hole (not shown) through which shafts of the indicating hands are inserted is formed at the center of the dial 5, which has a circular shape, and the second hand 1, the minute hand 2, and the hour hand 3 are attached to the shafts. The dial 5 does not necessarily have a circular shape and may have any shape according to the design of the dial 5. For example, the dial 5 may have an elliptical shape or a rectangular shape or any other polygonal shape.

The crown 40 is provided so as to allow time correction when pulled one step. The crown 40 may have other functions.

The dial 5 includes a color toning layer 18 (FIG. 2), which will be described later, and therefore has a luxurious appearance exhibiting a metallic luster and a deep blue color. In the present embodiment, the deep blue color having a metallic luster will be described as an example of the intended color tone. The intended color tone is a color tone having intended brightness, saturation, and hue.

Configuration of Dial and Method for Manufacturing Dial

Figure 2:
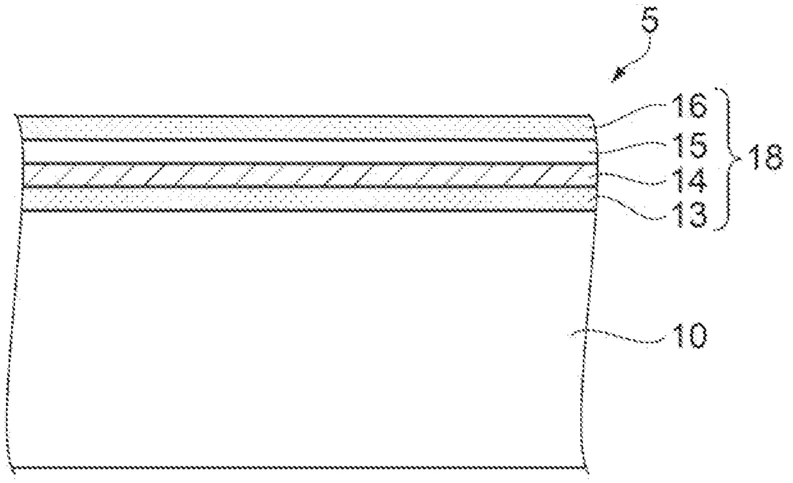
FIG. 2 is a cross-sectional view of a dial.
Figure 3:
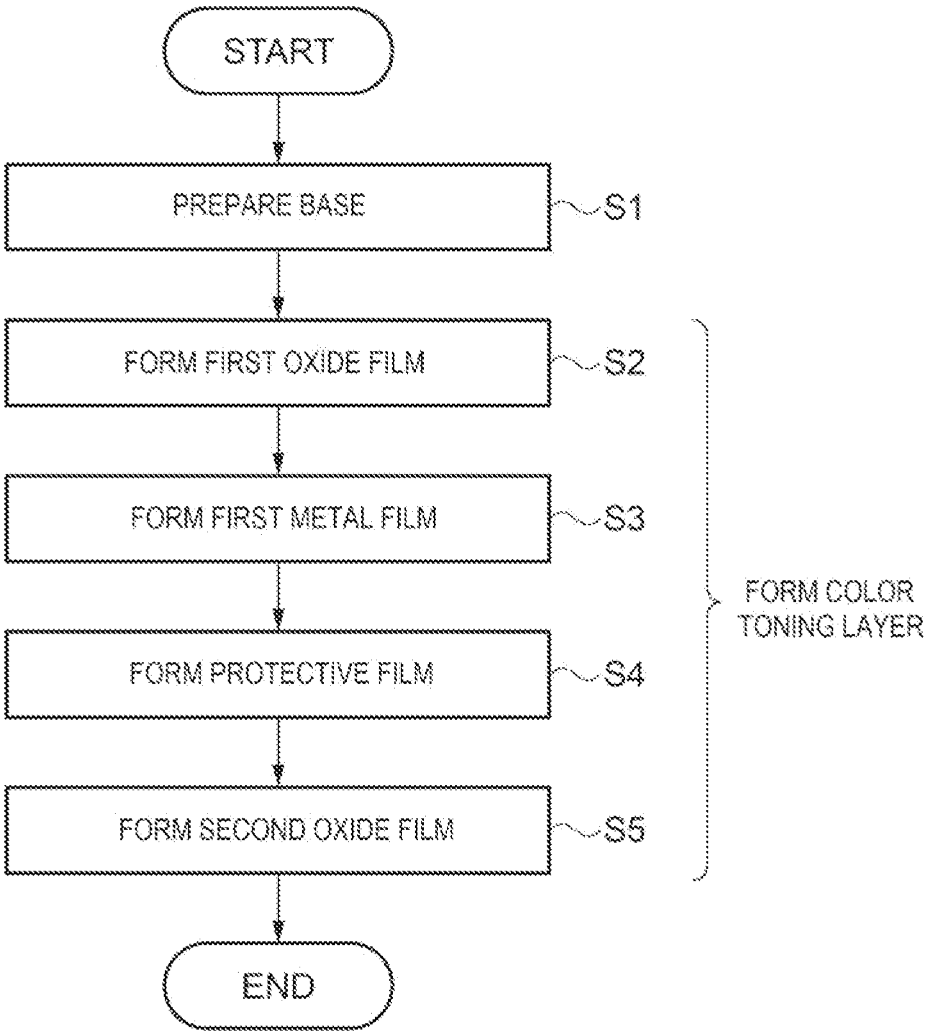
FIG. 3 is a flowchart showing the procedure of a method for manufacturing the dial.
Figure 4:
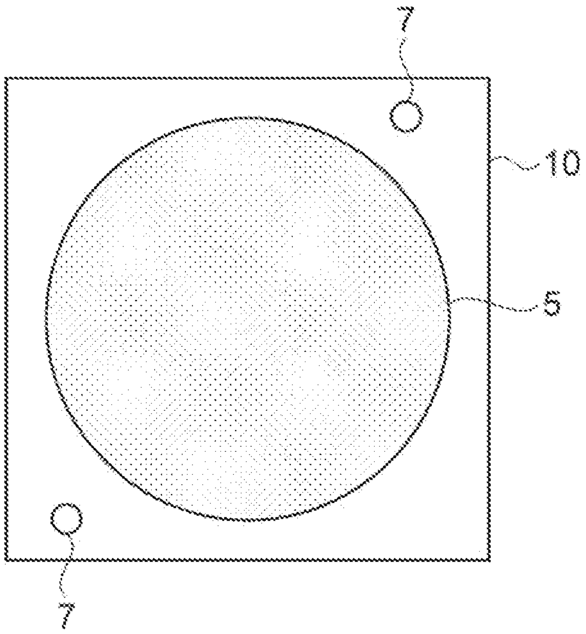
FIG. 4 is a plan view of a base.

FIG. 2 is a cross-sectional view of the dial. FIG. 3 is a flowchart showing the procedure of a method for manufacturing the dial. FIG. 4 is a plan view of a base.

The cross-sectional configuration of the dial 5 and the method for manufacturing the dial 5 will be described with reference to FIGS. 2 to 4.

The dial 5 has a configuration in which the color toning layer 18 is layered on a base 10, as shown in FIG. 2. The color toning layer 18 is formed of a plurality of functional films layered on each other. In detail, the color toning layer 18 is formed of a first oxide film 13, a first metal film 14, a protective film 15, and a second oxide film 16. In other words, the color toning layer 18 includes the first oxide film 13 and the second oxide film 16, and the first metal film 14 and the protective film 15 are provided in this order between the first oxide film 13 and the second oxide film 16.

The method for manufacturing the dial 5 will subsequently be described primarily with reference to FIG. 3 along with FIGS. 2 and 4 as appropriate.

In step S1, the base 10 is prepared. The base 10 shown in FIG. 4 is a metal substrate that will form the base of the dial 5. In the initial state, the base 10 has a substantially square shape, and a central portion thereof is an area where the circular dial 5 is formed, as shown in FIG. 4. In a preferable example, the base 10 is a brass plate having a thickness of about 0.3 mm. The material of the base 10 is not limited to brass, and it is preferable to use a base metal as compared with precious metals, such as nickel silver, Al, Ti, V, Cr, Fe, Co, Ni, Cu, Zn, Zr, Nb, Mo, In, Sn, Hf, Ta, W, Bi, and Mg, or an alloy containing at least one of the elements described above. It is noted that inclusion of a small amount of precious metals is not precluded.

The base 10 is provided with two reference holes 7 on a diagonal line thereof, as shown in FIG. 4. In a manufacturing step, the base 10 is placed in a jig provided with reference pins corresponding to the reference holes 7, and the positioned base 10 is processed in the following manufacturing steps.

In a preferable example, a film deposition process in each of step S2 and the following steps is carried out by using a vacuum evaporation apparatus. The vacuum evaporation apparatus has an ion assist function and a plasma function. The ion assist function causes an ion gun to radiate ionized gas molecules that press evaporation material molecules onto a deposition receiving surface, improving adhesion of the evaporation material molecules. The plasma function facilitates an oxide reaction with the aid of introduced gas plasma to provide a sputtering effect at the deposition receiving surface. In each of the following film deposition processes, film deposition is performed with the functions described above selectively activated in accordance with the characteristics of the functional film. In the following description, using the ion assist function is referred to an ion assist activated state, and using the plasma function is referred to a plasma activated state. Furthermore, a mixture of argon and oxygen is used as a treatment gas in the plasma treatment.

In step S2, the first oxide film 13 is formed at the surface of the base 10 by using the vacuum evaporation apparatus. The first oxide film 13 is preferably made of an oxide of a metal material. For example, $Ta_2O_5$ is deposited to form the first oxide film 13.

The thickness of the first oxide film 13 is, for example, set at about 50 nm. The first oxide film 13 is not necessarily made of niobium pentoxide and may instead be made of any other metal oxide. The first oxide film 13 may still instead be a laminate of a plurality of oxide films. The first oxide film 13 may still instead be a laminate of a plurality of oxide films. For example, the first oxide film 13 may be made of a material containing at least one selected from the group consisting of $Ta_2O_5$, $SiO_2$, $TiO_2$, $Al_2O_3$, $ZrO_2$, $Nb_2O_5$, and $HfO_2$. In other words, the first oxide film 13 includes one or more metal oxide films.

In step S3, the first metal film 14 is formed on the first oxide film 13 by using the vacuum evaporation apparatus. In a preferable example, Cr is deposited to form the first metal film 14. In a preferable example, the first metal film 14 has a thickness of, for example, about 10 nm. The first metal film 14 does not necessarily have the thickness described above and may have a thickness that provides a moderate brightness adjustment effect, for example, a thickness greater than or equal to 1 nm but smaller than or equal to 50 nm. The moderate brightness adjustment effect refers to a brightness adjustment function that allows see-through observation and making use of the appearance of the base 10 at the intended color tone. The first metal film 14 is not necessarily made of Cr and may instead be made of a material containing at least one selected from the group consisting of Al, Ti, V, Cr, Fe, Co, Ni, Cu, Zn, Zr, Nb, Mo, In, Sn, Hf, Ta, W, Bi, and Mg.

In step S4, the protective film 15 is formed on the first metal film 14. In a preferable example, $Al_2O_3$ is deposited to form the protective film 15. In this process, the vacuum evaporation apparatus is caused to operated in the ion assist deactivated state and the plasma activated state. The plasma function is activated to facilitate the alumina reaction and improve the accuracy of the refractive index of the film through the facilitated reaction. In a preferable example, the protective film 15 has a thickness of, for example, about 13 nm. The protective film 15 does not necessarily have the thickness described above and may have a thickness large enough to protect the first metal film 14 from the effect of the plasma treatment during the formation of the second oxide film 16 in the next step, and only needs to have a thickness greater than or equal to 10 nm. When no protective film 15 is provided, the first metal film 14 is damaged by the plasma treatment, resulting in a change in the color tone, which will be described later in detail.

In step S5, the second oxide film 16 is formed on the protective film 15. In a preferable example, the second oxide film 16 is formed of two layers, an $Nb_2O_5$ film and a $SiO_2$ film. Since the second oxide film 16 is the top layer of the color toning layer 18, the vacuum evaporation apparatus preferably is caused to operate in the ion assist activated state and the plasma activated state for high-density film deposition. In a preferable example, the $Nb_2O_5$ and $SiO_2$ films are both deposited in the ion assist activated state and the plasma activated state. In other words, the second oxide film 16 is formed of a plurality of oxide films, and the oxide films include one or more metal oxide films. The second oxide film 16 may instead be made of a material containing at least one selected from the group consisting of $Ta_2O_5$, $SiO_2$, $TiO_2$, $Al_2O_3$, $ZrO_2$, $Nb_2O_5$, and $HfO_2$, as the first oxide film 13 is. The thickness of the second oxide film 16 is, for example, set at about 25 nm. The second oxide film 16 does not necessarily have the thickness described above and may have a thickness greater than or equal to 1 nm but smaller than or equal to 50 nm.

The steps described above cause the color toning layer 18, which is formed of the first oxide film 13, the first metal film 14, the protective film 15, and the second oxide film 16, to be formed on the base 10, as shown in FIG. 2.

The above description has been made with reference to the case where the deep blue having a metallic luster is the intended color tone, but not necessarily. The intended color tone can be any of other color tones having a variety of types of brightness, saturation, and hue according to the design of the dial, such as dark red and purple having a metallic luster.

The above description has been made with reference to the case where the base 10 is made of metal, but not necessarily. For example, the base 10 may be formed of a resin substrate. The first metal film 14 is a thin film having a brightness adjustment effect of transmitting a certain amount of light, but still has a certain metallic luster because the first metal film 14 is made of metal. Therefore, when the metallic luster required for the intended color tone is satisfied by the metallic luster of the first metallic film 14, the base 10 may be made of a material having no metallic luster such as resin. In this case, the base material 10 can be made, for example, of a glass material such as sapphire glass, soda glass, crystalline glass, quartz glass, lead glass, potassium glass, borosilicate glass, and alkali-free glass, a ceramic material such as alumina and titania, or a plastic material such as a variety of thermoplastic resins and a variety of curable resins.

Comparison of Spectral Data

Figure 5:
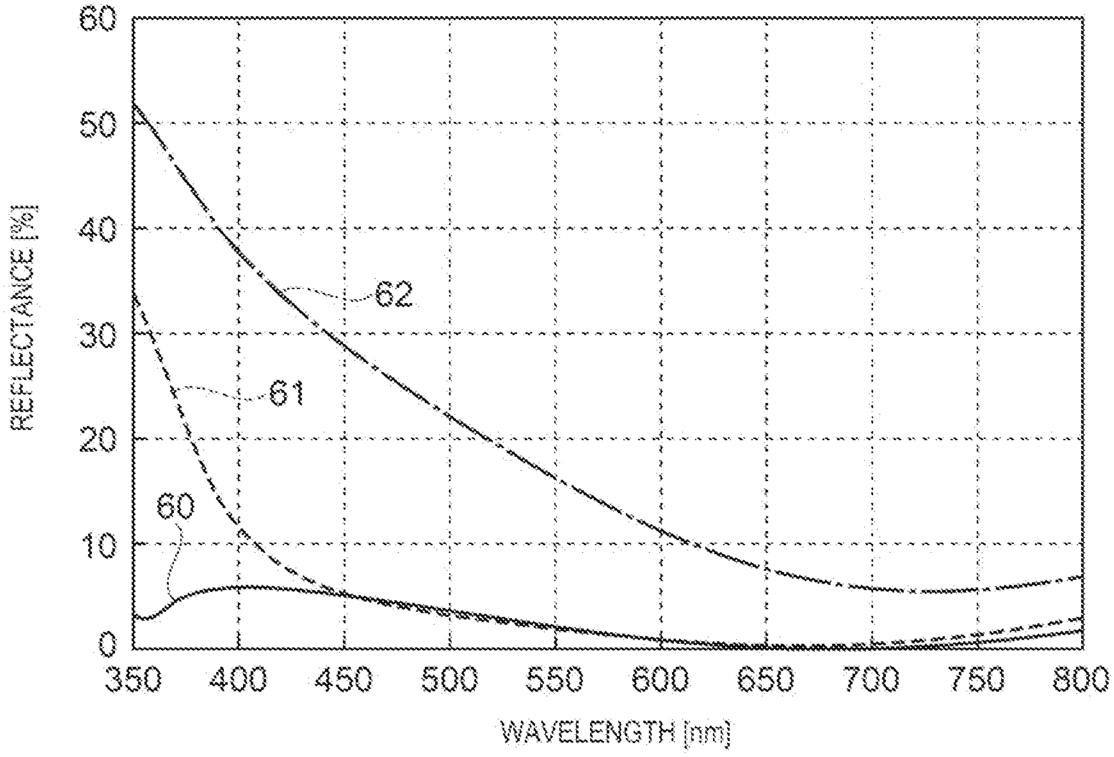
FIG. 5 is a graphical diagram for comparing spectral data produced by different toning layers.

FIG. 5 is a graphical diagram for comparing spectral data produced by different toning layers. In FIG. 5, the horizontal axis represents the wavelength in nm and the vertical axis represents the reflectance.

A graph 60 in FIG. 5 shows spectral data on the spectrum produced by the dial 5 including the color toning layer 18 in FIG. 2. A graph 61 is Comparative Example and shows spectral data in a case where the protective film 15 is not provided. A graph 62 is Comparative Example and shows spectral data in a case where neither the first metal film 14 nor the protective film 15 is provided. The graphs were derived from results of a simulation based on results of experiments conducted by the inventor and others.

First, the intended color tone of the dial 5 including the color toning layer 18 is the deep blue having a metallic luster, as described above, which, when profiled in FIG. 5, has a peak at a wavelength of about 400 nm, and the reflectance at the peak needs to be greater than or equal to 5% but smaller than or equal to 7%. The reflectance at a wavelength of about 700 nm is preferably smaller than or equal to 2%.

In view of the requirements described above, the graph 60, which peaks at the wavelength of about 400 nm, where the reflectance is 6%, matches the intended profile. Furthermore, since the reflectance at the wavelength of about 700 nm is smaller than 1%, it is recognized that the intended color tone is substantially reproduced.

In contrast, the graph 61 in Comparative Example peaks at a wavelength of about 350 nm, where the reflectance is about 33%, and therefore does not match the intended profile and results in a bright purplish color tone. The reason for this is that during the formation of the second oxide film 16 in step S5 in the absence of the protective film 15, the $Nb_2O_5$ film was formed directly on the first metal film 14 in the plasma-activated state, so that the refractive index of the Cr film changed due to alterations including oxidation of the Cr film itself, which changed how the interference occurred in the entire color toning layer 18, resulting in a deviation from the intended color tone.

The graph 62 in Comparative Example, which peaks at a wavelength of about 350 nm, where the reflectance is about 52%, does not match the intended profile and results in a bright purple color tone. Furthermore, the reflectance at the wavelength of about 700 nm is about 6%, so that a bright color tone is provided over the entire wavelength range. The reason for this is that the absence of the first metal film 14 having a brightness adjustment function makes the color tone too bright over the entire wavelength range, so that none of the intended brightness, saturation, and hue can be obtained.

As described above, the dial 5 and the timepiece 100 according to the present embodiment can provide the effects below.

The dial 5 as the timepiece part includes the base 10 and the color toning layer 18 provided on the base 10. The color toning layer 18 includes the first oxide film 13, the first metal film 14, the protective film 15, and the second oxide film 16. The first oxide film 13 is provided between the base 10 and the second oxide film 16. Between the first oxide film 13 and the second oxide film 16, the first metal film 14 and the protective film 15 are provided in this order from the side facing the first oxide film 13.

According to the configuration described above, unlike the related-art technology in which the color toning layer is formed of a plurality of oxide films, providing the first metal film 14 having a brightness adjustment function between the first oxide film 13 and the second oxide film 16 allows formation of a color toning layer formed of fewer films than in the related-art color toning layer but having a comparable color toning function. In other words, the fewer films allows excellent productivity and high reliability in the individual functional films.

The intended color tone can therefore be provided by the color toning layer 18 having the simple configuration.

The dial 5 having the simple configuration but exhibiting the intended color tone can therefore be provided.

It is preferable that the first metal film 14 has a thickness greater than or equal to 1 nm but smaller than or equal to 50 nm.

Therefore, when the first metal film 14 has an optimum thickness according to the intended color tone but being greater than or equal to 1 nm but smaller than or equal to 50 nm, an optimum brightness adjustment function that allows transmission of a fixed amount of light can be provided. In other words, a first metal film 14 having an optimal brightness adjustment function that makes use of the appearance of the base 10 can be formed.

It is further preferable that the first oxide film 13 includes one or more metal oxide films.

The thus configured first oxide film 13 can optimize the brightness adjustment properties of the color toning layer 18.

It is further preferable that the second oxide film 16 is formed of a plurality of oxide films, and that the oxide films include one or more metal oxide films.

The thus configured second oxide film 16 can optimize the brightness adjustment properties of the color toning layer 18.

It is further preferable that the metal oxide film is made of a material containing at least one selected from the group consisting of $Ta_2O_5$, $SiO_2$, $TiO_2$, $Al_2O_3$, $ZrO_2$, $Nb_2O_5$, and $HfO_2$.

The thus configured metal oxide film can optimize the brightness adjustment properties of the color toning layer 18.

It is further preferable that the first metal film 14 is made of a material containing at least one selected from the group consisting of Al, Ti, V, Cr, Fe, Co, Ni, Cu, Zn, Zr, Nb, Mo, In, Sn, Hf, Ta, W, Bi, and Mg.

The thus configured first metal film 14 can allow selection of a metallic luster in accordance with the intended color tone.

It is further preferable that the protective film 15 is made of $Al_2O_3$.

The thus configured protective film 15 can protect the first metal film 14, whereby the intended color tone can be obtained.

The timepiece 100 includes the dial 5.

The timepiece 100 including the dial 5 exhibiting the intended color tone can therefore be provided.

Second Embodiment

Clear Layer Inclusive Aspect 1

Figure 6:
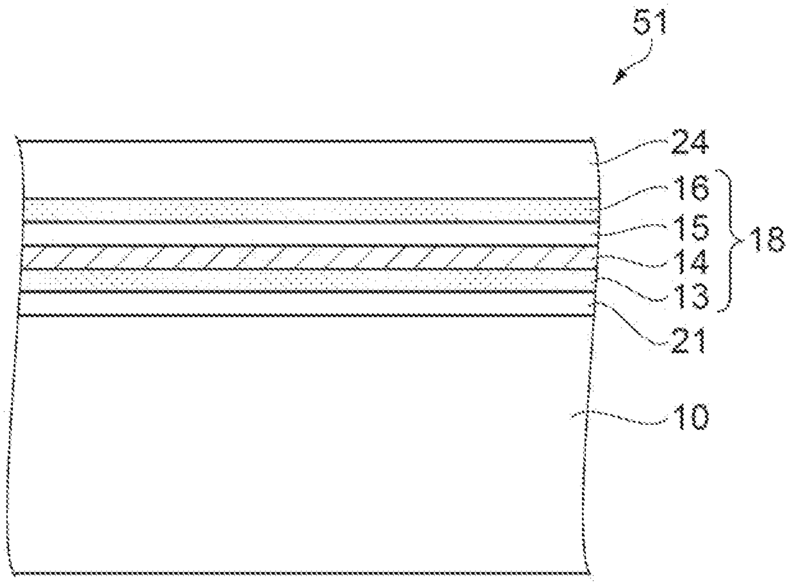
FIG. 6 is a cross-sectional view of a dial according to a second embodiment.

FIG. 6 is a cross-sectional view of a dial 51 according to the present embodiment and corresponds to FIG. 2. The aforementioned embodiment has been described with reference to the case where the color toning layer 18 forms the top surface of the dial, however, a clear layer 24 may be provided on the color toning layer 18. In the following description, the same constituent portions as those in the first embodiment have the same reference characters and will not be redundantly described.

The dial 51 according to the present embodiment includes a buffer layer 21, the color toning layer 18, and the clear layer 24 layered in this order on the base 10, as shown in FIG. 6. In a preferable example, the clear layer 24, which forms the top surface, is made of acrylic resin. Acrylic resin has a coefficient of linear expansion greater than that of the oxide films that form the color toning layer 18 and therefore shrinks by a large amount due to a change in temperature. In view of the fact described above, providing the buffer layer 21, which has a coefficient of linear expansion close to that of the clear layer 24, between the base 10 and the color toning layer 18 prevents the color toning layer 18 from peeling off due to the shrinkage of the clear layer 24.

The buffer layer 21 is formed of a $SiO_2$ film in a preferable example. The $SiO_2$ film is formed by using the vacuum evaporation apparatus operating in the ion assist activated state and the plasma activated state. In a preferable example, the buffer layer 21 has, for example, a thickness of about 58 nm. The buffer layer 21 does not necessarily have the thickness described above and may have a thickness that allows reduction in the thermal shrinkage resulting from a change in the temperature of the clear layer 24, for example, a thickness greater than or equal to about 50 nm. Furthermore, the buffer layer 21 is not necessarily formed of an $SiO_2$ film and may be made of any light transmissive material having a coefficient of linear expansion close to the coefficient of linear expansion of the clear layer 24.

In a preferable example, the clear layer 24 is formed by applying acrylic resin onto the entire surface of the base 10 by using a paint liquid discharger. After the application, the base 10 may be rotated to allow the resultant centrifugal force to perform diffusive application of the paint liquid across the entire surface of the base 10. Still instead, the clear layer 24 may be formed by spray painting, spin coating, ink jetting, screen printing, or any other method.

The paint liquid is not limited to acrylic resin and may be any non-conducting transparent resin material, for example, cellulose resin, polyurethane resin, and acrylic lacquer resin.

As described above, the dial 51 according to the present embodiment can provide the following effects in addition to the effects provided by the first embodiment described above.

The dial 51 includes the clear layer 24 at the top surface of the dial 51, and the buffer layer 21 is provided between the base 10 and the color toning layer 18.

Therefore, even when the clear layer 24 shrinks, the buffering effect of the buffer layer 21 prevents the color toning layer 18 from peeling off.

Furthermore, providing the clear layer 24 at the top surface of the dial 51 increases three-dimensionality and transparency, making the appearance of the dial 51 more luxurious.

Third Embodiment

Clear Layer Inclusive Aspect 2

Figure 7:
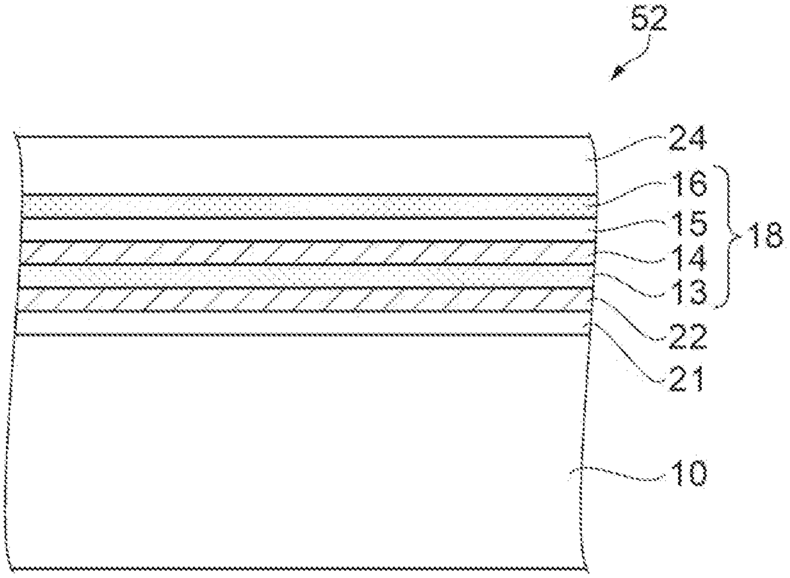
FIG. 7 is a cross-sectional view of a dial according to a third embodiment.

FIG. 7 is a cross-sectional view of a dial 52 according to the present embodiment and corresponds to FIG. 6.

In the configuration shown in FIG. 6, a second metal film 22 may be provided between the buffer layer 21 and the color toning layer 18. The second metal film 22 is provided to cancel the tinge of the color of the base 10. In the following description, the same constituent portions as those in the first embodiment have the same reference characters and will not be redundantly described.

The dial 52 according to the present embodiment includes the buffer layer 21, the second metal film 22, the color toning layer 18, and the clear layer 24 layered in this order on the base 10, as shown in FIG. 7. In a preferable example, the second metal film 22 is a Cr film. The Cr film is formed by using the vacuum evaporation apparatus. In a preferable example, the second metal film 22 has, for example, a thickness of about 70 nm. The second metal film 22 does not necessarily have the thickness described above and may have a thickness that prevents see-through observation of the underlying base 10, for example, a thickness greater than or equal to about 50 nm. The second metal film 22 is not necessarily formed of a Cr film, and may be formed of any metal film having a tinge according to the intended color tone. For example, the second metal film 22 can be made of the same material of the first metal film 14.

As described above, the dial 52 according to the present embodiment can provide the following effect in addition to the effects provided by the embodiments described above.

The dial 52 includes the second metal film 22 between the buffer layer 21 and the color toning layer 18.

Therefore, providing the second metal film 22 allows expression of a tinge different from that of the color of the base 10. The dial 52 exhibiting a greater variety of color tones can therefore be provided.

Fourth Embodiment

Timepiece

Figure 8:
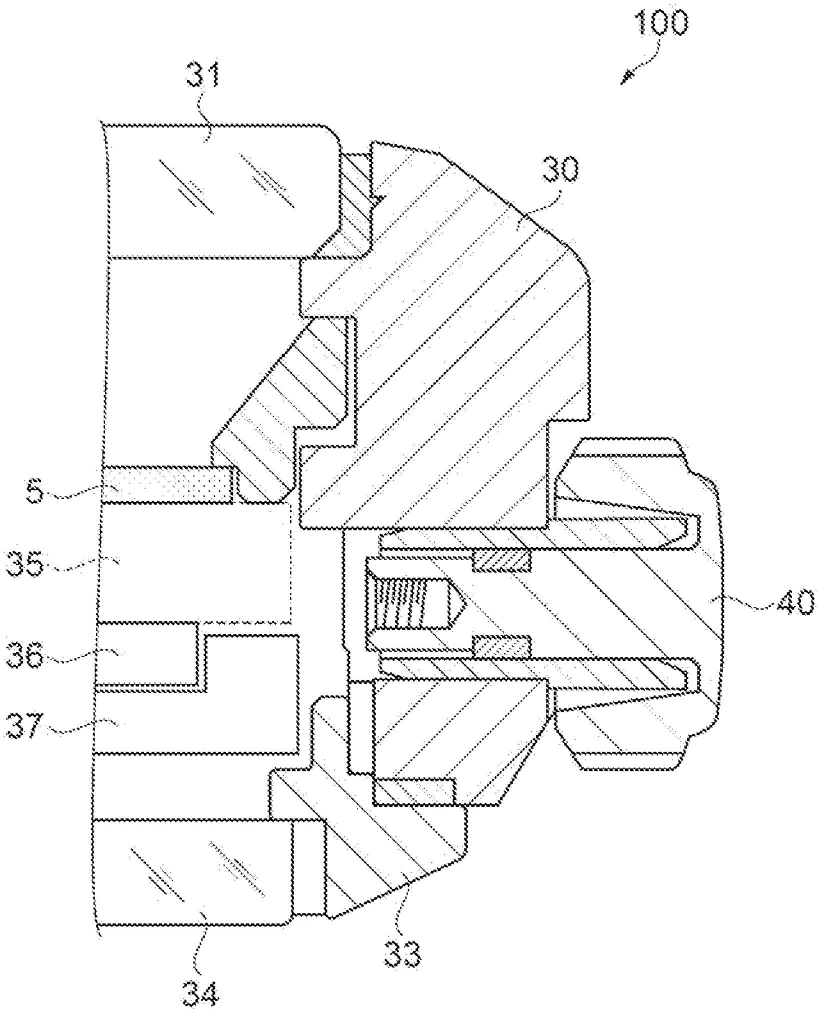
FIG. 8 is a cross-sectional view of a timepiece according to a fourth embodiment.

FIG. 8 is a cross-sectional view of a timepiece taken along the line b-b in FIG. 1.

The timepiece 100 according to the present embodiment is formed of the case band 30, a windshield 31, the crown 40, a case back 33, a case back glass plate 34, and the like. The case band 30 accommodates the dial 5, the movement 35, a main plate 36, an oscillating weight 37, and other components.

The timepiece 100 is a skeleton model that allows observation of the oscillating weight 37 and the main plate 36 inside the case band 30 through the case back glass plate 34.

The aforementioned embodiments have been described with reference to the dial 5, which includes the color toning layer 18, as an example of the timepiece part, but not necessarily, and the present disclosure is applicable to a variety of timepiece parts. For example, the case band 30, the crown 40, the case back 33, and a band (not shown), which are each made of a metal material, may be provided with the color toning layer 18.

The oscillating weight 37 and the main plate 36 are internal mechanical parts each made of a metal material. In the case of the skeleton model, the parts described above are part of the appearance and may therefore be provided with the color toning layer 18 or the clear layer 24. Screws that fix the oscillating weight 37, wheel trains, and bearings (none of which are shown) may also be provided with the color toning layer 18 or the clear layer 24.

The configurations described above can still provide timepiece parts that exhibit the intended color tone as in each of the embodiments described above. Furthermore, a richly designed timepiece 100 can be provided by providing exterior parts and mechanical parts with a variety of color tones.

What is claimed is:

1. A timepiece part comprising:

a base;

a color toning layer provided on the base; and an $SiO_2$ buffer layer provided between the base and the color toning layer; and a clear layer at a top surface of the timepiece part, wherein the color toning layer includes a first oxide film, a first metal film, a protective film, and a second oxide film, a material of the first oxide film is different from a material of the buffer layer, a first coefficient of linear expansion of the clear layer is greater than coefficients of linear expansion of each of the first oxide film and the second oxide film that form the color toning layer, a second coefficient of linear expansion of the $SiO_2$ buffer layer is greater than the coefficients of linear expansion of each of the first oxide film and the second oxide film that form the color toning layer, the first oxide film is provided between the base and the second oxide film, and between the first oxide film and the second oxide film, the first metal film and the protective film are provided in a presented order from a side facing the first oxide film.

2. The timepiece part according to claim 1, wherein the first metal film has a thickness greater than or equal to 1 nm but smaller than or equal to 50 nm.

3. The timepiece part according to claim 1, wherein the first oxide film includes one or more metal oxide films.

4. The timepiece part according to claim 3, wherein the metal oxide film is made of a material containing at least one selected from a group consisting of $Ta_2O_5$, $SiO_2$, $TiO_2$, $Al_2O_3$, $ZrO_2$, $Nb_2O_5$, and $HfO_2$.

5. The timepiece part according to claim 1, wherein the second oxide film is formed of a plurality of oxide films, and the oxide films include one or more metal oxide films.

6. The timepiece part according to claim 1, wherein the first metal film is made of a material containing at least one selected from a group consisting of Al, Ti, V, Cr, Fe, Co, Ni, Cu, Zn, Zr, Nb, Mo, In, Sn, Hf, Ta, W, Bi, and Mg.

7. The timepiece part according to claim 1, wherein the protective film is made of $Al_2O_3$.

8. The timepiece part according to claim 1, further comprising a second metal film between the buffer layer and the color toning layer.

9. A timepiece comprising the timepiece part according to claim 1.

* * * * *